United States Patent
Gromme

(10) Patent No.: US 9,328,805 B2
(45) Date of Patent: *May 3, 2016

(54) CHAIN-TENSIONING DEVICE

(71) Applicant: Comau S.p.A., Grugliasco (Turin) (IT)

(72) Inventor: Gianpiero Gromme, Grugliasco (IT)

(73) Assignee: Comau S.p.A., Grugliasco (Turin) (IT)

( * ) Notice: Subject to any disclaimer, the term of this patent is extended or adjusted under 35 U.S.C. 154(b) by 3 days.

This patent is subject to a terminal disclaimer.

(21) Appl. No.: 14/080,147

(22) Filed: Nov. 14, 2013

(65) Prior Publication Data

US 2014/0141910 A1 May 22, 2014

(30) Foreign Application Priority Data

Nov. 20, 2012 (EP) ..................................... 12193363

(51) Int. Cl.
*F16H 7/12* (2006.01)
*F16H 7/08* (2006.01)

(52) U.S. Cl.
CPC ...... *F16H 7/1263* (2013.01); *F16H 2007/0806* (2013.01); *F16H 2007/087* (2013.01); *F16H 2007/088* (2013.01); *F16H 2007/0874* (2013.01); *F16H 2007/0891* (2013.01)

(58) Field of Classification Search
CPC .......... F16H 7/1263; F16H 2007/0806; F16H 2007/087; F16H 2007/0891
USPC ........................... 474/132, 136; 198/813–816
See application file for complete search history.

(56) References Cited

U.S. PATENT DOCUMENTS

| | | | | |
|---|---|---|---|---|
| 3,115,046 A * | 12/1963 | Bliss et al. | ..................... | 474/111 |
| 4,511,348 A * | 4/1985 | Witdoek et al. | ............... | 474/109 |
| 4,787,879 A * | 11/1988 | Pritchard | ........................ | 474/49 |
| 4,881,929 A * | 11/1989 | Randles | ........................ | 474/111 |
| 6,358,169 B1 * | 3/2002 | Markley | ........................ | 474/111 |
| 8,888,625 B2 * | 11/2014 | Lehman et al. | ............... | 474/117 |
| 2003/0224889 A1 * | 12/2003 | Luh | ............................... | 474/134 |
| 2012/0196710 A1 * | 8/2012 | Lehman et al. | ............... | 474/117 |

* cited by examiner

*Primary Examiner* — Michael Mansen
*Assistant Examiner* — Mark K Buse
(74) *Attorney, Agent, or Firm* — Young Basile Hanlon & MacFarlane P.C.

(57) ABSTRACT

A chain-tensioning device comprises at least one main chain-tensioning sprocket wheel on which a chain engages, a main spring that urges a shaft of the main chain-tensioning sprocket wheel in a direction of tensioning of the chain, and an auxiliary cam element that engages a cam-follower element operatively connected to the shaft of the main chain-tensioning sprocket wheel so as to tend to push this shaft in the tensioning direction under the action of auxiliary elastic means. The auxiliary cam element automatically recovers any play that is generated owing to wear of the chain and prevents a movement of the chain-tensioning sprocket wheel in a direction opposite to the tensioning direction. In a variant, two main chain-tensioning sprocket wheels are provided, each having a respective auxiliary cam element. The two auxiliary cam elements may form part of a single pivoted lever.

12 Claims, 6 Drawing Sheets

CHAIN-TENSIONING DEVICE

TECHNICAL FIELD

The present invention generally relates to chain-tensioning devices.

BACKGROUND

Chain-tensioning devices may be of the type comprising at least one main chain-tensioning sprocket wheel for engagement of a chain, and a main spring that urges the shaft of said main chain-tensioning sprocket wheel in a chain-tensioning direction.

Chain-tensioning devices of the type specified above are, for example, used in industrial pallet conveyors in which an endless chain is provided engaging on sprocket wheels with horizontal or vertical axes, at least one of which is motor-driven, to enable movement of a plurality of pallets along the conveyor.

SUMMARY

One object of the present invention is to provide a chain-tensioning device that will be simple, efficient, and functional.

Another object of the invention is to provide a chain-tensioning device that will guarantee proper tensioning of the chain in any condition of operation of the equipment on which it is used, moreover providing automatic recovery of any play that might arise in the chain following upon its wear.

In the case where the arrangement is such as to enable movement of the chain in any of the two opposite directions, a further object of the invention is to provide a chain-tensioning device that is adapted to operate properly in both directions of movement of the chain.

Yet a further object of the invention is to provide a chain-tensioning device that is simple to install and to set up in operation.

With a view to achieving the above purposes, one subject of the present invention is a chain-tensioning device having the characteristics indicated at the beginning of this description and characterized in that it further comprises an auxiliary cam element that engages a cam-follower element operatively connected to the shaft of said main chain-tensioning sprocket wheel so as to tend to push said shaft in said tensioning direction under the action of auxiliary elastic means in such a way that said auxiliary cam element automatically recovers any play that is generated owing to wear of the chain and prevents any movement of the chain-tensioning sprocket wheel in a direction opposite to the tensioning direction.

Thanks to provision of the aforesaid cam element, the device according to the invention has the advantage of proper tensioning of the chain in any condition of operation, preventing the oscillations to which the main chain-tensioning sprocket wheel would be otherwise subjected above all in transient operating conditions, for example when the chain is set in motion, or when the speed of movement thereof is varied, not to mention cases in which the direction of movement is reversed. A further advantage lies in the possibility of installing and setting up the chain-tensioning device in a simple and fast way, since the device is calibrated automatically with installation of the aforesaid cam element.

According to a further preferred characteristic, the aforesaid cam surface is shaped in such a way as to keep the overall force due to the main spring and to the auxiliary cam element that is applied to the main chain-tensioning sprocket wheel substantially constant as the deformation of the main spring varies.

In a preferred embodiment, the auxiliary cam element is constituted by a portion of a lever articulated to the supporting structure of the chain-tensioning device, said auxiliary elastic means being constituted by a spring set between said lever and the fixed supporting structure of the chain-tensioning device.

According to a further characteristic, the fixed supporting structure of the chain-tensioning device comprises guide means, for example in the form of slits, for guiding the shaft of said main chain-tensioning sprocket wheel according to a rectilinear direction of movement orthogonal to said shaft.

In the case where the chain-tensioning device has to operate on a chain that is to be displaced in any of two opposite directions, it may include two main chain-tensioning sprocket wheels, for engagement in succession of the chain, two main springs that urge the shafts of said main chain-tensioning sprocket wheels in two mutually opposite directions, two cam surfaces, forming part of two separate auxiliary cam elements or of a single cam element, which engage cam-follower elements operatively connected to the shafts of said main chain-tensioning sprocket wheels so as to tend to push said shafts in said mutually opposite directions under the action of said auxiliary elastic means in such a way that, for each direction of movement of the chain, one of said main chain-tensioning sprocket wheels tensions the chain as a result of its displacement in a first direction caused by the main spring and by the cam surface associated thereto, while the other chain-tensioning sprocket wheel is hindered by the cam surface associated thereto from moving in said first direction, the aforesaid functions of the two main chain-tensioning sprocket wheels and of the two cam surfaces being reversed with each other when the direction of movement of the chain is reversed.

In the case of a chain-tensioning device designed to operate in any of the two directions of movement of the chain, the two aforesaid cam surfaces may be formed on two auxiliary cam elements pivotally mounted on the supporting structure of the chain-tensioning device about two axes set at a distance from one another. However, according to the preferred solution, the two cam surfaces are formed on two opposite end portions of a single lever articulated at the center to the supporting structure of the chain-tensioning device.

In the case of an apparatus with endless chain that can be displaced in both directions, when the direction of circulation of the chain is reversed, the chain tends to slacken in the stretch set downstream of the driving sprocket wheel on which the chain is engaged, but the aforesaid chain-tensioning device acts automatically for restoring the right tension. This solution enables a considerable simplification and saving of components as compared to the case where two separate chain-tensioning devices were to be provided, designed to intervene each for a respective direction of circulation of the chain.

In addition to performing the function of proper tensioning of the chain whenever the direction of movement thereof is reversed, the chain-tensioning device forming a subject of the present invention also recovers automatically at every moment any play that is brought about in the chain as a result of its wear. In particular, in the case of a single oscillating lever defining the two cam surfaces, installation and adjustment of the device are simple and fast, since the device is calibrated automatically by assembly of the aforesaid lever.

It is moreover possible to provide sensor means designed to detect when lengthening of the chain due to wear exceeds a pre-set value, in which case there may be envisaged, for example, automatic arrest of the conveyor as warning of the need for intervention on the chain for eliminating one or more links of chain or replacing the chain.

BRIEF DESCRIPTION OF THE DRAWINGS

Further characteristics and advantages of the invention will emerge from the ensuing description, with reference to the annexed drawings, which are provided purely by way of non-limiting example and in which.

DETAILED DESCRIPTION

Figure 1:
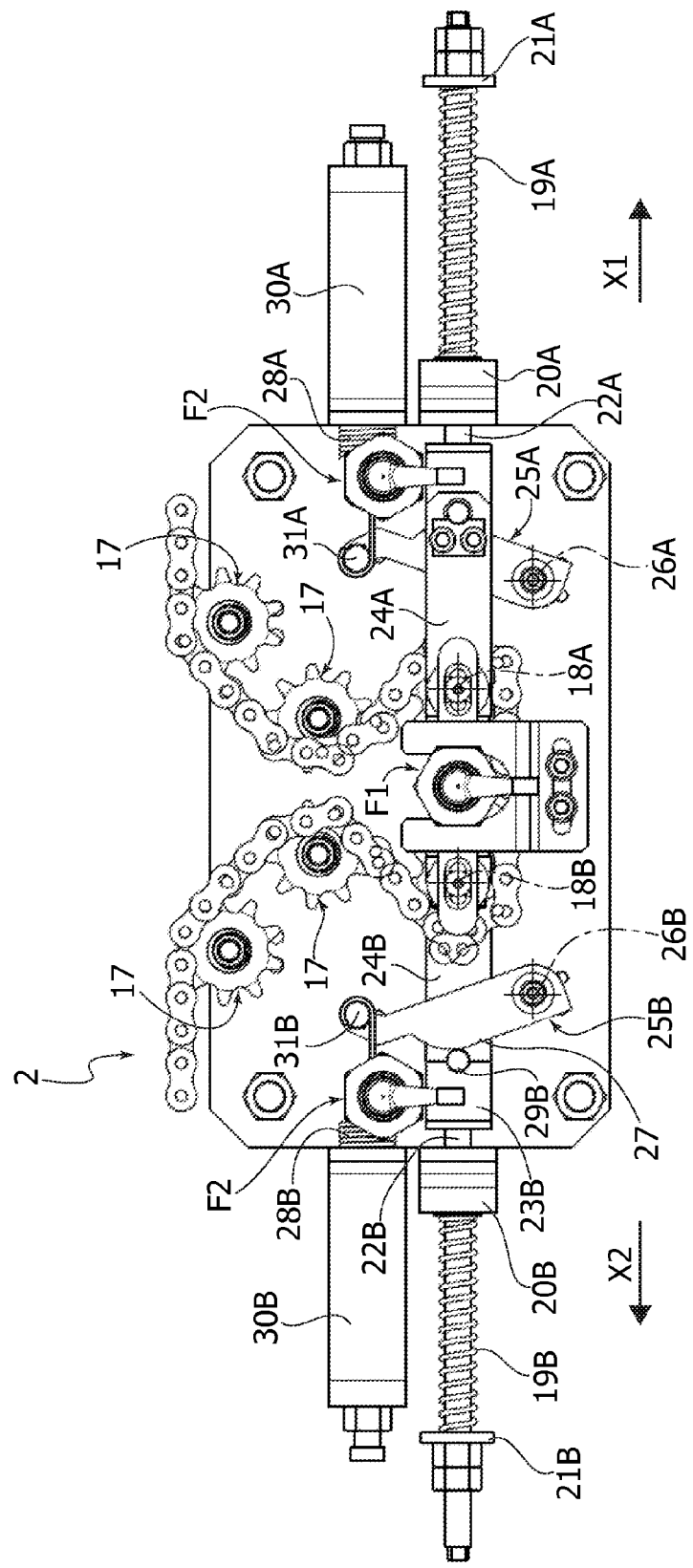
FIGS. 1-4 are a front view and perspective views of a chain-tensioning device according to the invention, of the double-acting type, i.e., designed to operate with an endless chain that can move in both directions.
Figure 2:
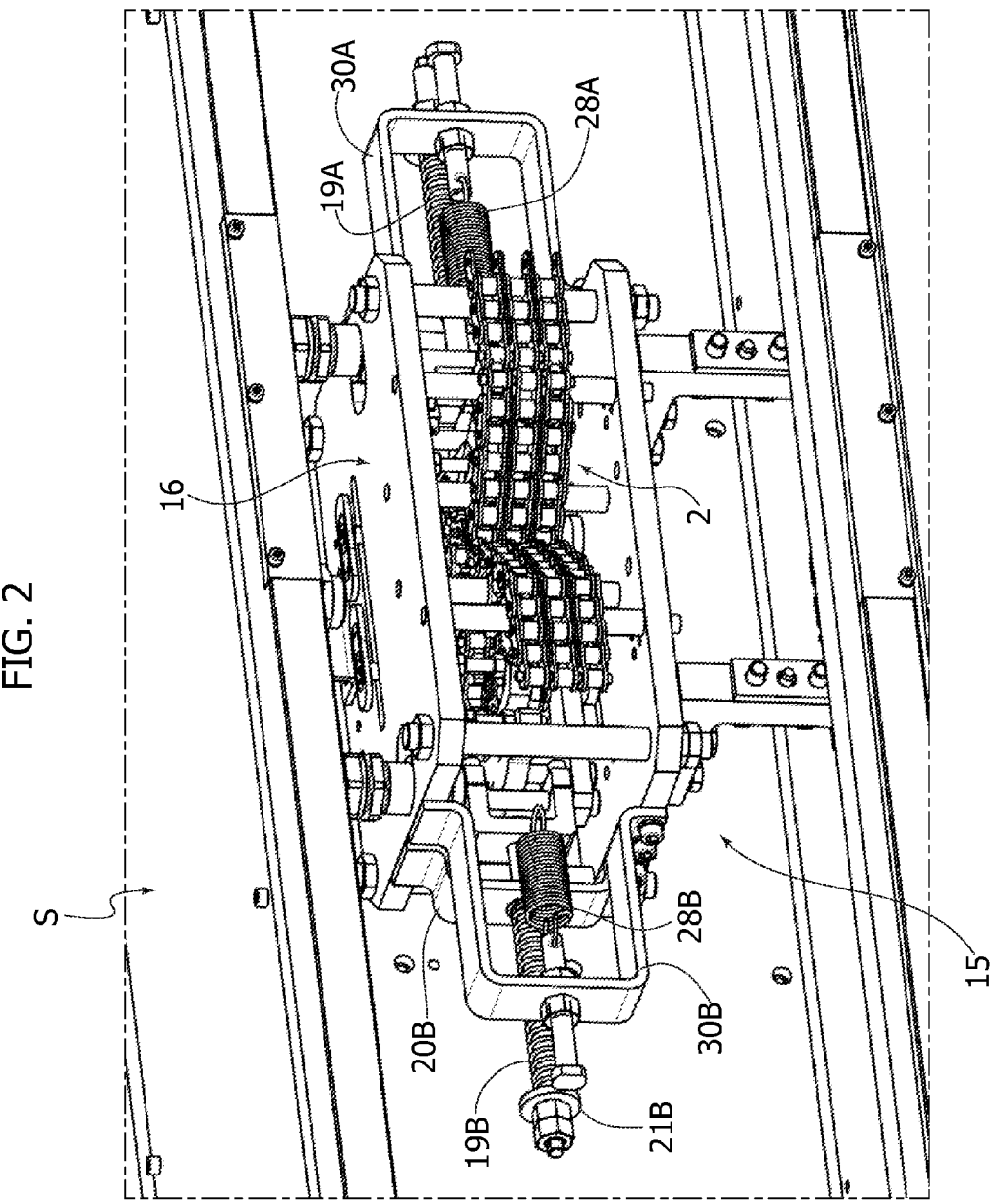
Figure 3:
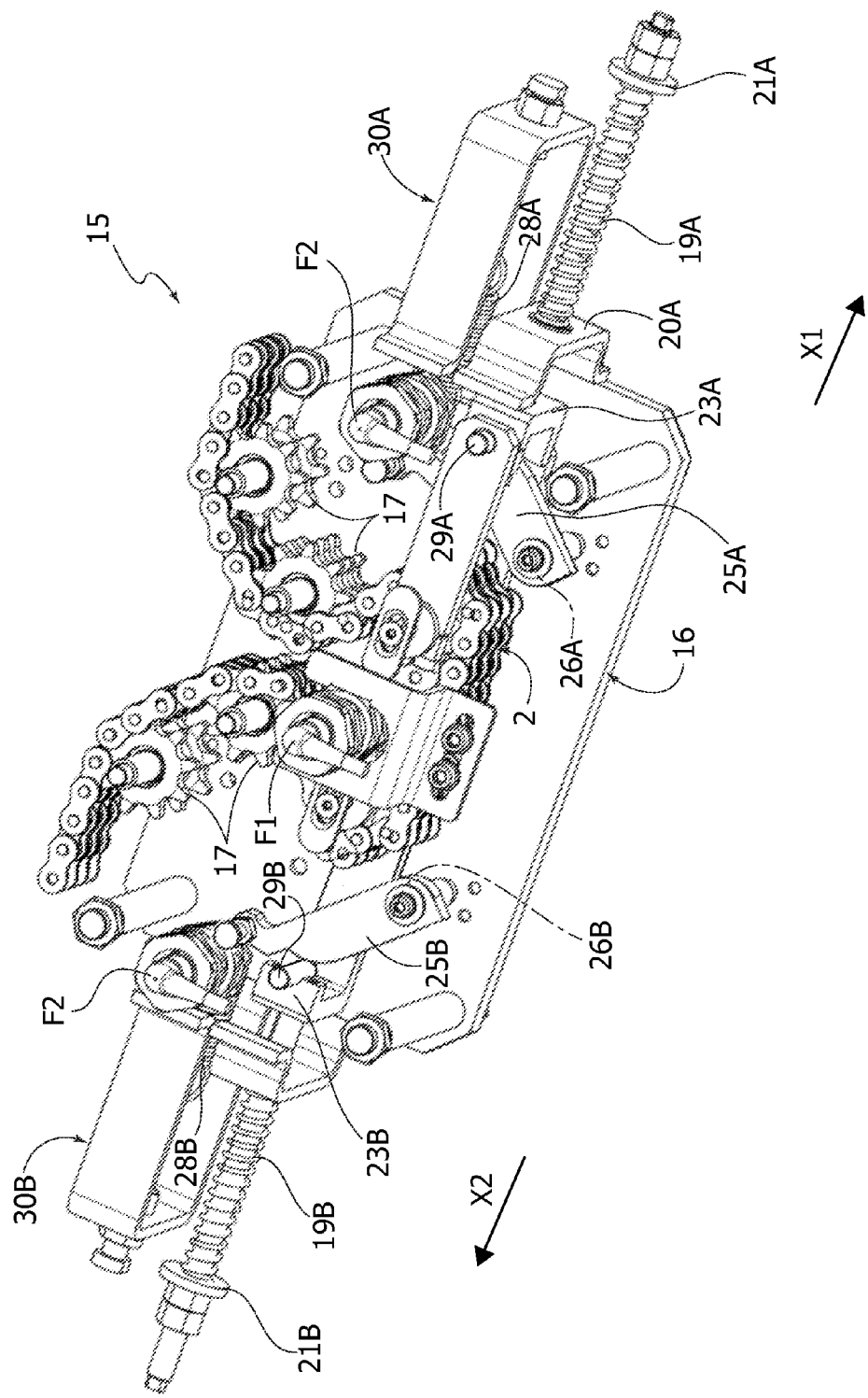

FIGS. 1-4 of the annexed drawings refer to a first embodiment of the device of the invention, in the version designed to operate on an endless chain that can be driven in both directions of movement. A preferred application of this device is on a horizontal-carousel conveyor for conveying pallets. However, even if conceived and developed with reference to this specific application, the device is considered to be of general use. With reference to said figures, the chain-tensioning device 15 comprises a fixed supporting structure 16. The structure 16 includes a pair of parallel plates spaced apart from one another, between which a plurality of sprocket wheel units 17 are freely rotatably mounted, for directing the chain according to a path substantially in form of an omega (see FIG. 1). In the central stretch of said path, the chain 2 engages two sets 18A, 18B of main chain-tensioning sprocket wheels.

The sets 17 of transmission sprocket wheels are mounted so that they can turn freely on the supporting structure 16 about fixed axes, whereas the sets of main chain-tensioning sprocket wheels 18A, 18B are mounted on shafts 180A, 180B that are urged in mutually opposite directions X1, X2 by two main springs 19A, 19B. In the ensuing description and in the annexed drawings the parts associated to each of the two sets of chain-tensioning sprocket wheels 18A, 18B are designated by the same reference numbers, except for the addition of the letters A and B.

Each of the two shafts 180A 180B of the two sets 18A, 18B has the ends guided within slits 182 of the plates that constitute the fixed supporting structure 16 in such a way that each of said shafts can be displaced according to a rectilinear direction orthogonal to the shaft. Each spring 19A, 19B is a helical spring set axially between a bracket 20A, 20B secured to the fixed supporting structure 16, and a contrast disk 21A, 21B secured to the end of a stem 22A, 22B set through the spring 19A, 19B and passing through a hole of the plate 20A, 20B. At the opposite end, the stem 22A, 22B is secured to a forklike body 23A, 23B, the branches of which are connected to a pair of plates 24A, 24B, mounted between which is the shaft 180A, 180B of the respective set of chain-tensioning sprocket wheels 18A, 18B.

According to a further characteristic of the described example, moreover associated to the two sets of chain-tensioning sprocket wheels 18A, 18B are two auxiliary cam elements 25A, 25B. In the example illustrated in FIGS. 1-4, said auxiliary cam elements 25A, 25B are in the form of levers pivoted on the fixed supporting structure 16 about two distinct axes 26A, 26B.

Each auxiliary cam element (25A, 25B) has a cam surface 27 (see FIG. 1) that is urged by a secondary spring 28A, 28B against a cam-follower element constituted by a cylindrical pin 29A, 29B carried in a transverse direction by the two branches of the forklike member 23A, 23B (which is mobile with the respective set of chain-tensioning sprocket wheels 18A, 18B).

Figure 4:
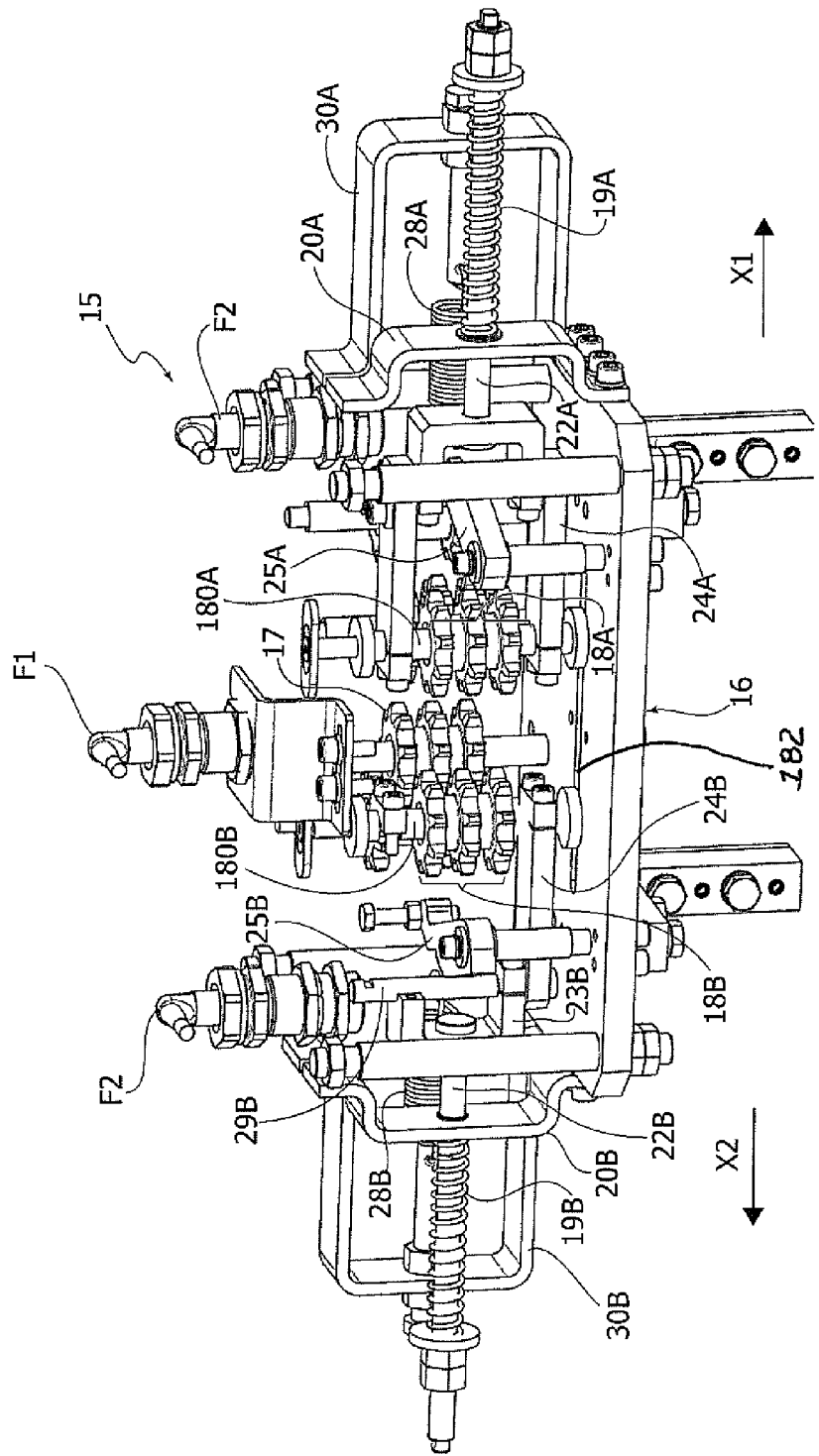

Each secondary spring 28A, 28B is a helical spring set parallel and adjacent to the respective main spring 19A, 19B and having one end anchored to a bracket 30A, 30B, which in turn is secured to the fixed structure 16 (see in particular FIG. 4). The opposite end of each spring 28A, 28B is anchored to one end 31A, 31B of the respective lever 25A, 25B.

Thanks to the structure and arrangement described above, the chain-tensioning device 15 is able to tension the chain properly whenever the direction of movement of the chain is reversed. For example, with reference to FIG. 1, assuming that the branch of the chain 2 to the right of the device 15 has slackened, the set of chain-tensioning sprocket wheels 18A automatically tensions the chain, as a result of its displacement in the direction X1 due to the tensile force exerted by the main spring 19A and by the secondary spring 28A (via the auxiliary cam element 25A). At the same time, the auxiliary cam element 25B hinders a movement of the set of chain-tensioning sprocket wheels 18B in the direction X1. When the direction of movement of the chain is reversed, so that the branch of chain that is set to the left of the device in FIG. 1 slackens, the function of the two sets of chain-tensioning sprocket wheels 18A, 18B is reversed, so that the set of chain-tensioning sprocket wheels 18B is urged in the direction X2 by the springs 19B, 28B, while the auxiliary cam element 25A hinders a movement in the direction X2 of the set of chain-tensioning sprocket wheels 18A.

A further characteristic of the described example lies in the fact that the cam surface 27 of each of the auxiliary cam elements 25A, 25B is shaped in such a way as to maintain the overall force due to the main spring 19A, 19B and to the auxiliary cam element 25A, 25B, applied to the respective main chain-tensioning sprocket wheel 18A, 18B substantially constant as the deformation of the main spring 19A, 19B varies.

The chain-tensioning device is also able to recover automatically any play that is brought about in the chain following upon wear.

The device 15 is moreover provided with sets of sensor F1, F2 of any known type (see FIG. 3) designed to detect the position of the auxiliary cam elements 25A, 25B and also when the distancing between the shafts of the sprocket wheels 18A, 18B exceeds a pre-set value, in which case there may be envisaged, for example, an automatic arrest of the conveyor as warning of the need for an intervention on the chain for eliminating one or more links of chain or for replacing the chain.

Figure 5:
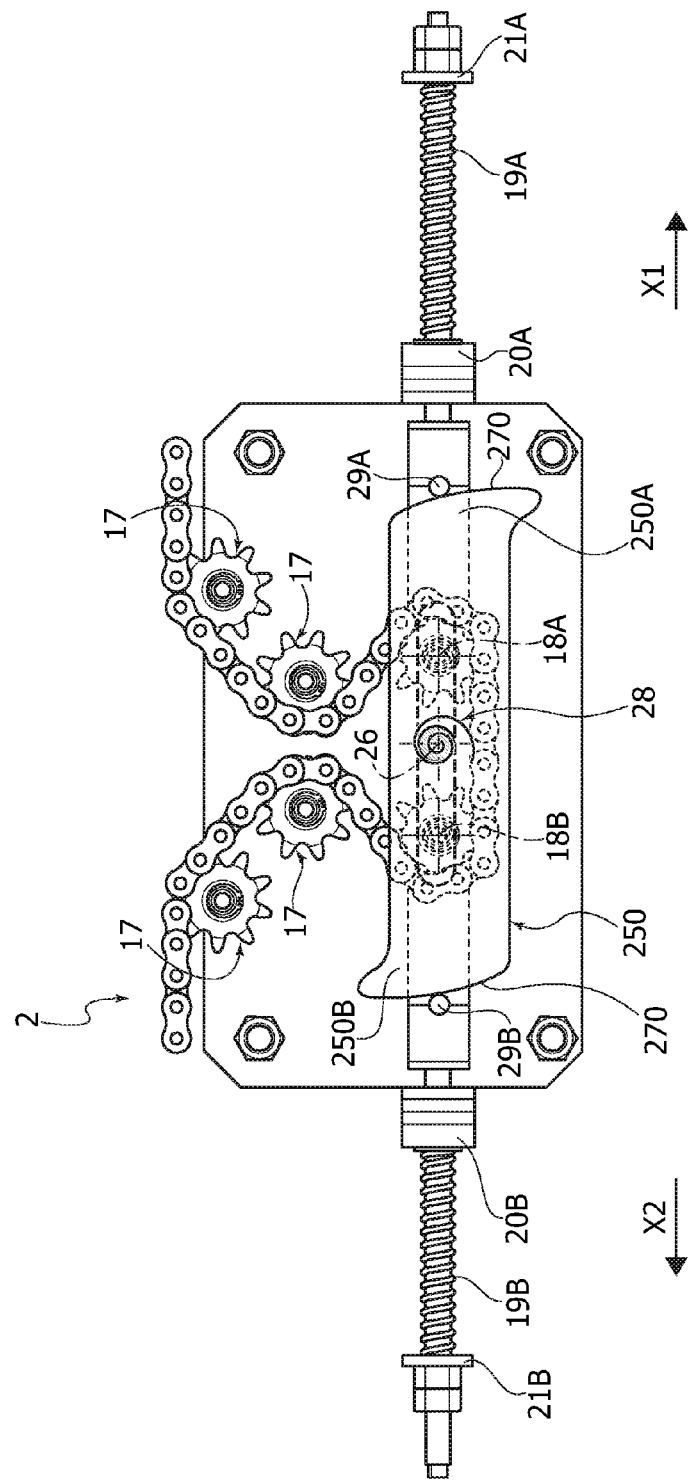
FIG. 5 illustrates a preferred variant of the device of FIGS. 1-4.

FIG. 5 shows a variant of the chain-tensioning device in which the auxiliary cam elements (250A, 250B) are constituted by two opposite end portions of a single lever 250 articulated at the center to the supporting structure 16 of the chain-tensioning device 15 about an axis 26. Each auxiliary cam element 250A, 250B has a cam surface 270 in contact with the cam-follower element 29A, 29B operatively connected to the shaft of the respective chain-tensioning sprocket wheel 18A, 18B. In this case, the auxiliary elastic means may be two helical springs that connect each end portion of the lever 250 to the fixed structure 16 or else may be constituted by a single spiral spring mounted concentrically to the axis of articulation 26 of the lever 250 and set between the lever 250 and the structure 16.

Said embodiment of the chain-tensioning device is preferred in so far as it enables operations of assembly and adjustment of the device that are simpler and faster, owing to the fact that an automatic calibration of the device itself is obtained at the moment when the lever 250 is installed.

Figure 6:
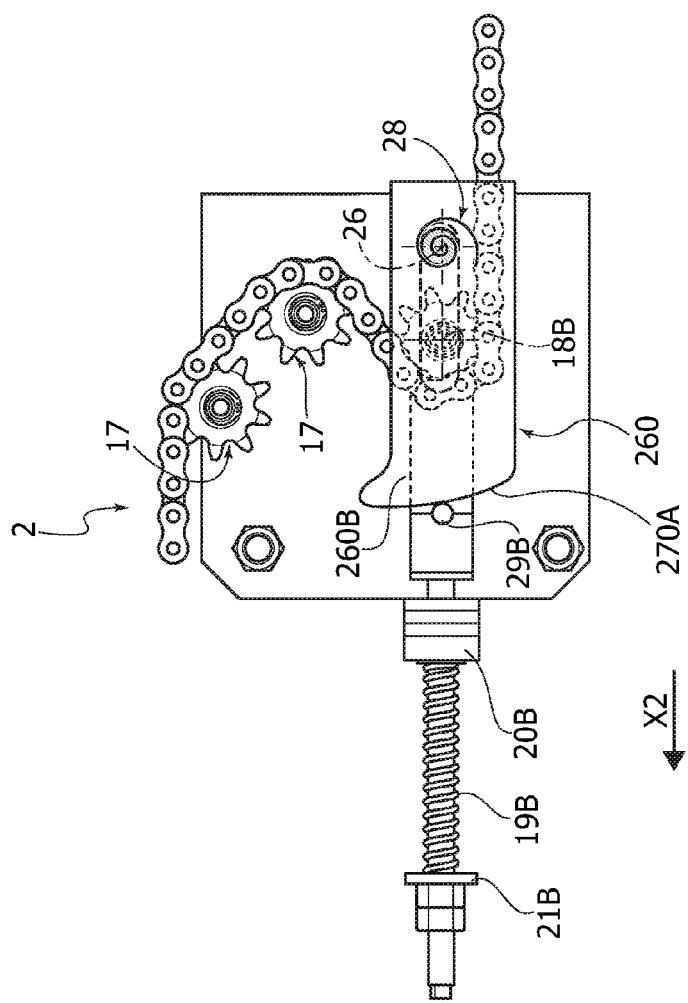
FIG. 6 illustrates a further simplified variant, which can be used with chains that move in just one direction.

Finally, FIG. 6 illustrates a simplified variant of the embodiment of FIG. 5, substantially corresponding to just one half of the device of FIG. 5. Said solution may be used in all the applications where the chain is mobile only in a specific direction so that it is sufficient to provide a single main spring 19 and a single lever 260 with a single cam surface 270A. It would moreover be possible to configure the device as half of the device of FIGS. 1-4.

Also in the simplified solution of FIG. 6, the invention guarantees proper tensioning of the chain in any condition of operation of the apparatus on which it is used, moreover envisaging an automatic recovery of any play that might arise in the chain following upon its wear and moreover enabling operations of installation and adjustment that are simple and fast.

In a possible variant, the pin for articulation of the lever 250,260 is guided in a slidable way at its ends within slits, which may even be the same guide slits as those of the shafts of the chain-tensioning sprocket wheels, in such a way that the device is able to detect, with the aid of sensor means of any type, any possible malfunctioning that might lead to a displacement of the pin of the lever with respect to a normal neutral position in which the opposite forces to which it is subjected balance.

Of course, without prejudice to the principle of the invention, the details of construction and the embodiments may vary widely with respect to what has been described and illustrated herein purely by way of example, without thereby departing from the scope of the present invention.

What is claimed is:

1. A chain-tensioning device, comprising:
   at least one main chain-tensioning sprocket wheel on which a chain engages, the chain having a predefined path of travel and a path length of travel;
   a main spring that urges a shaft of said main chain-tensioning sprocket wheel in a direction of tensioning of the chain; and
   an auxiliary cam element, which engages a cam-follower element operatively connected to said shaft of said main chain-tensioning sprocket wheel so as to tend to push said shaft in said direction of tensioning under the action of auxiliary elastic means,
   in such a way that said auxiliary cam element automatically increases the chain path length of travel to recover any play that is generated owing to lengthening of the chain and prevents a movement of the chain-tensioning sprocket wheel in a direction opposite to the tensioning direction.

2. The chain-tensioning device according to claim 1, wherein said auxiliary cam element includes a cam surface engaging the cam follower, said cam surface is shaped in such a way as to maintain the overall force due to the main spring and to the auxiliary cam element that is applied to the main chain-tensioning sprocket wheel substantially constant as the deformation of the main spring varies.

3. The chain-tensioning device according to claim 1, wherein a fixed supporting structure of the chain-tensioning device comprises guide means defining slits for guiding the shaft of said main chain-tensioning sprocket wheel in a rectilinear direction of movement orthogonal to said shaft.

4. A chain-tensioning device comprising:
   two main chain-tensioning sprocket wheels on which a chain engages in succession;
   two main springs that respectively urge a shaft of each said main chain-tensioning sprocket wheels in two mutually opposite directions; and
   two cam surfaces formed on two separate auxiliary cam elements or on a single auxiliary cam element, each cam surface respectively engages a cam-follower element operatively connected to the respective shaft of each of said main chain-tensioning sprocket wheels so as to tend to push said shafts in said mutually opposite directions under the action of an auxiliary elastic means for the two separate or single auxiliary cam element,
   in such a way that, for each direction of movement of the chain, one of said main chain-tensioning sprocket wheels tensions the chain as a result of its displacement in a first direction caused by the main spring and by the cam surface associated thereto, while the other chain-tensioning sprocket wheel is hindered by the cam surface associated thereto from moving in said first direction, the aforesaid functions of the two main chain-tensioning sprocket wheels and of the cam surfaces being reversed with each other when the direction of movement of the chain is reversed.

5. The chain-tensioning device according to claim 4, wherein the auxiliary cam elements comprise two levers, the respective cam surfaces are formed on the two levers, which are pivotally mounted on a fixed supporting structure of the chain-tensioning device about two axes spaced apart from one another and each of which has the cam surface in contact with the cam-follower element operatively connected to the shaft of a respective chain-tensioning sprocket wheel.

6. The chain-tensioning device according to claim 4, wherein the single auxiliary cam element comprises a single lever, wherein the cam surfaces are formed on two opposite end portions of the single lever articulated at a center to a fixed supporting structure of the chain-tensioning device, each end portion having one of the two cam surfaces in contact with a cam-follower element operatively connected to the shaft of a respective chain-tensioning sprocket wheel.

7. The chain tensioning device of claim 4 wherein the two cam surfaces are on the single auxiliary cam element, the single auxiliary cam element positioned between the cam-followers on the respective shafts; and
   the auxiliary elastic means comprises a torsion spring connected to the single auxiliary cam element.

8. A chain-tensioning device, comprising:
   at least one main chain-tensioning sprocket wheel on which a chain engages;
   a main spring that urges a shaft of said main chain-tensioning sprocket wheel in a direction of tensioning of the chain;
   a cam-follower operatively connected to the shaft of said main chain-tensioning sprocket;
   an auxiliary cam element comprising a portion of a lever articulated to a fixed supporting structure of the chain-tensioning device, the cam element engaging the cam-follower; and
   auxiliary elastic means comprising a spring set between said lever and the fixed supporting structure of the chain-tensioning device, the cam element operative to push said shaft in said direction of tensioning under the action of the auxiliary elastic means, in such a way that said auxiliary cam element automatically recovers any play that is generated owing to the wear of the chain and prevents a movement of the chain-tensioning sprocket wheel in a direction opposite to the tensioning direction.

9. A chain-tensioning device, comprising:
at least one main chain-tensioning sprocket wheel on which a chain engages;
a main spring that urges a shaft of said main chain-tensioning sprocket wheel in a direction of tensioning of the chain; and
an auxiliary cam element engages a cam-follower element operatively connected to said shaft of said main chain-tensioning sprocket wheel so as to tend to push said shaft in said direction of tensioning under the action of auxiliary elastic means, the auxiliary cam element is positioned between the main chain-tensioning sprocket wheel and the cam follower in such a way that said auxiliary cam element automatically recovers any play that is generated owing to the wear of the chain and prevents a movement of the chain-tensioning sprocket wheel in a direction opposite to the tensioning direction.

10. The chain tensioning device of claim 9 wherein the auxiliary cam element is a pivoted lever having a first end and a second end, the first end having a pivot and axis of rotation positioned between the cam follower and main chain-tensioning sprocket wheel and the second end connected to the auxiliary elastic means.

11. A chain-tensioning device, comprising:
at least one main chain-tensioning sprocket wheel on which a chain engages;
a main spring that urges a shaft of said main chain-tensioning sprocket wheel in a direction of tensioning of the chain; and
an auxiliary cam element, which engages a cam-follower element operatively connected to said shaft of said main chain-tensioning sprocket wheel so as to tend to push said shaft in said direction of tensioning under the action of a biasing element positioned offset and substantially parallel to the main spring in such a way that said auxiliary cam element automatically recovers any play that is generated owing to the wear of the chain and prevents a movement of the chain-tensioning sprocket wheel in a direction opposite to the tensioning direction.

12. The chain tensioning device of claim 11 wherein the biasing element comprises a tension spring connected to the auxiliary cam element adapted to force the main chain tensioning-tensioning sprocket wheel in the direction of tensioning the chain.

\* \* \* \* \*